March 21, 1944.  H. F. H. SHIELDS ET AL  2,344,742
APPARATUS FOR LOADING AND UNLOADING WHEELED VEHICLES
Filed Feb. 10, 1943   10 Sheets-Sheet 1
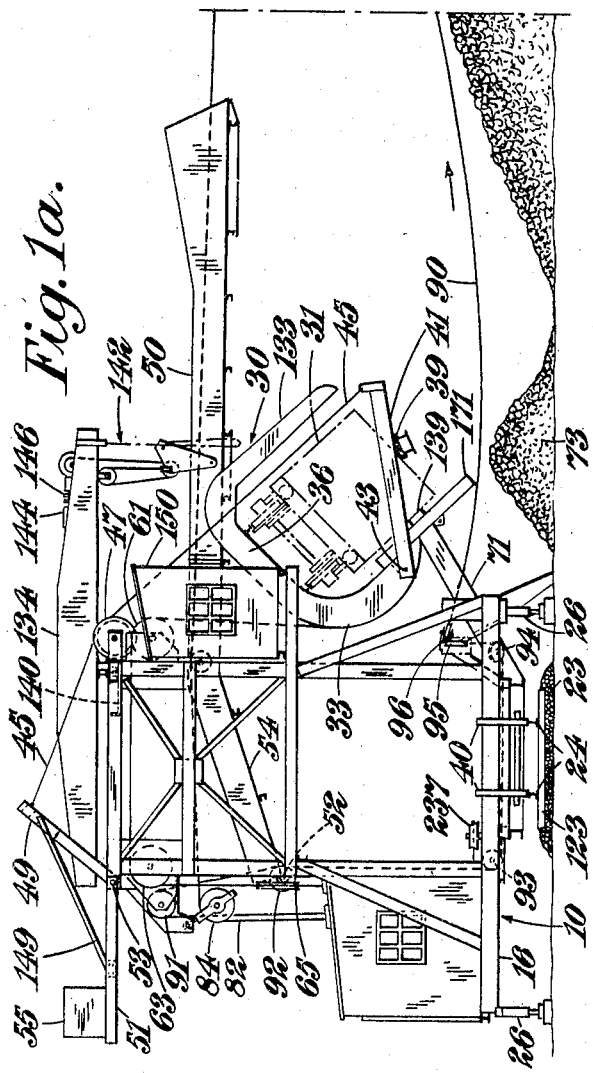
Inventors,
H. F. H. Shields and
G. W. Grossmith
By
Young, Emery & Thompson
Attys.

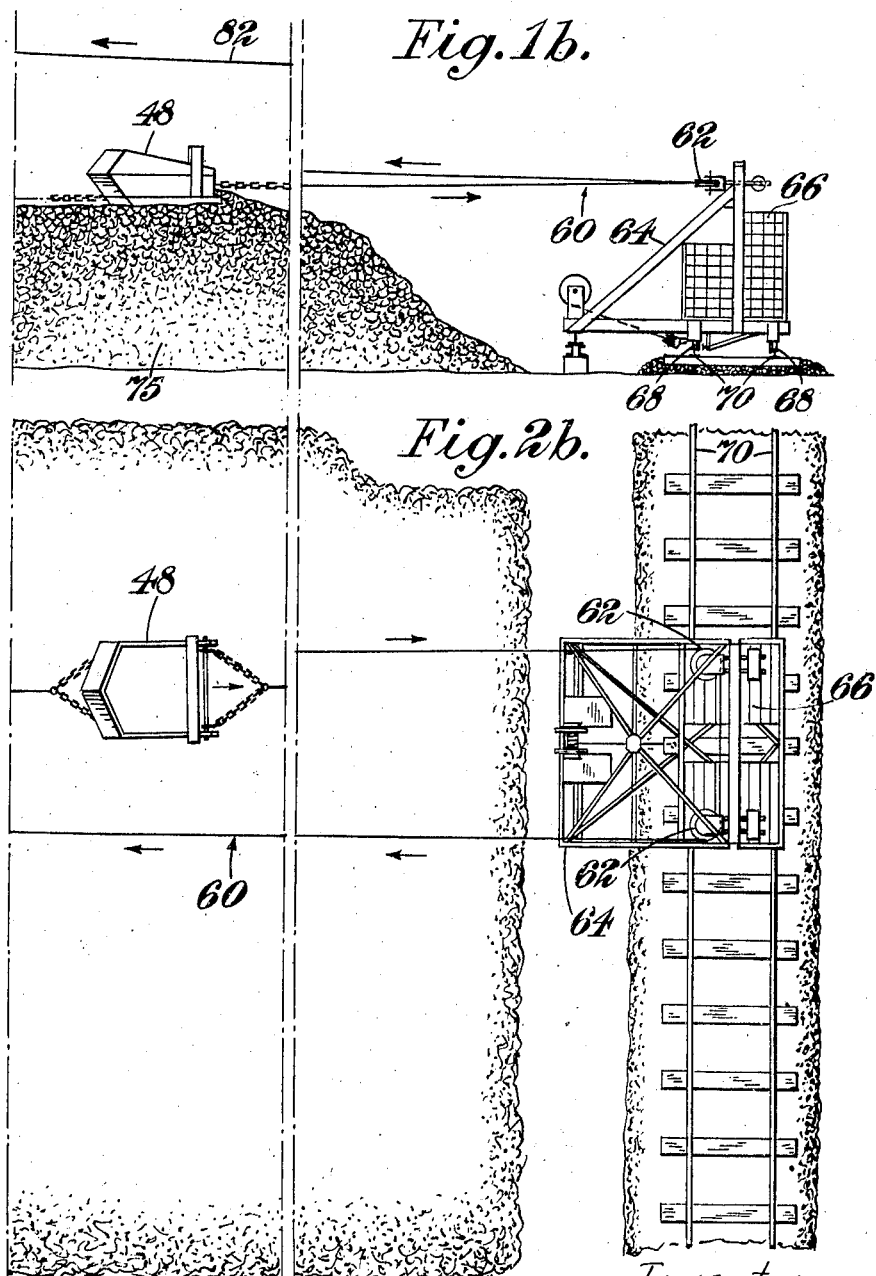

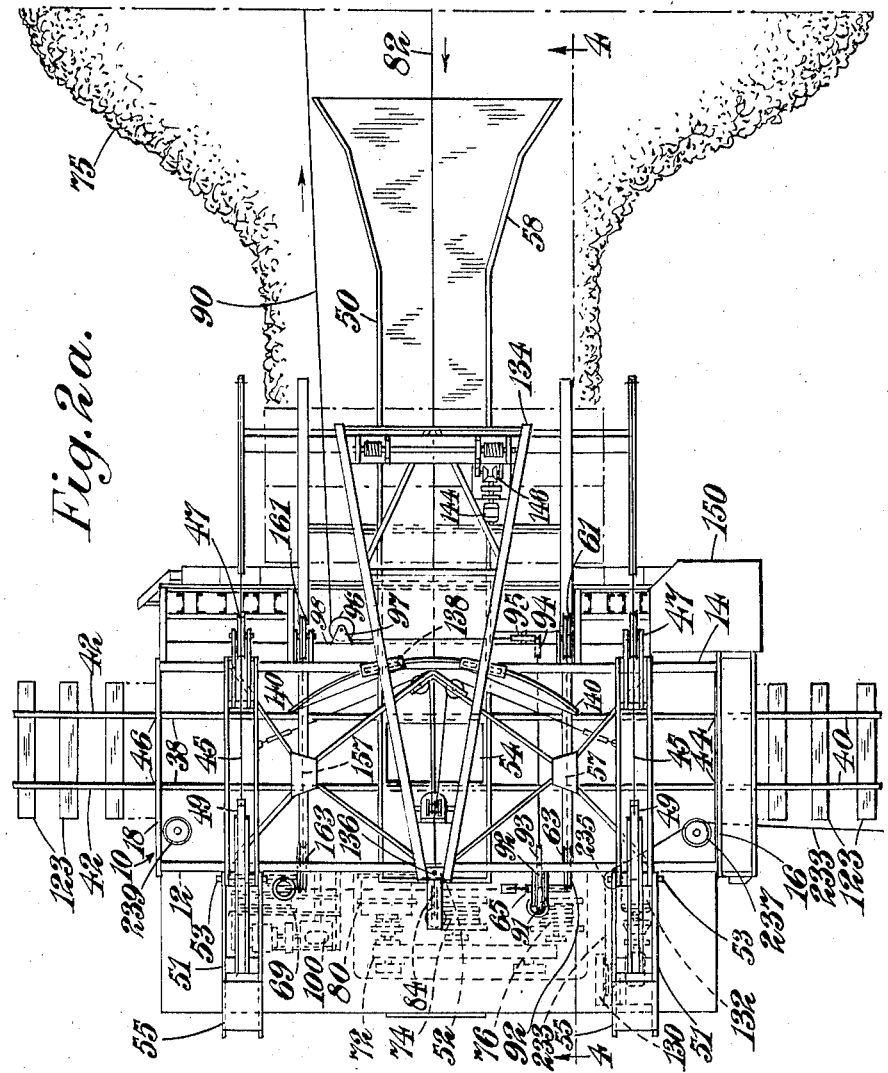

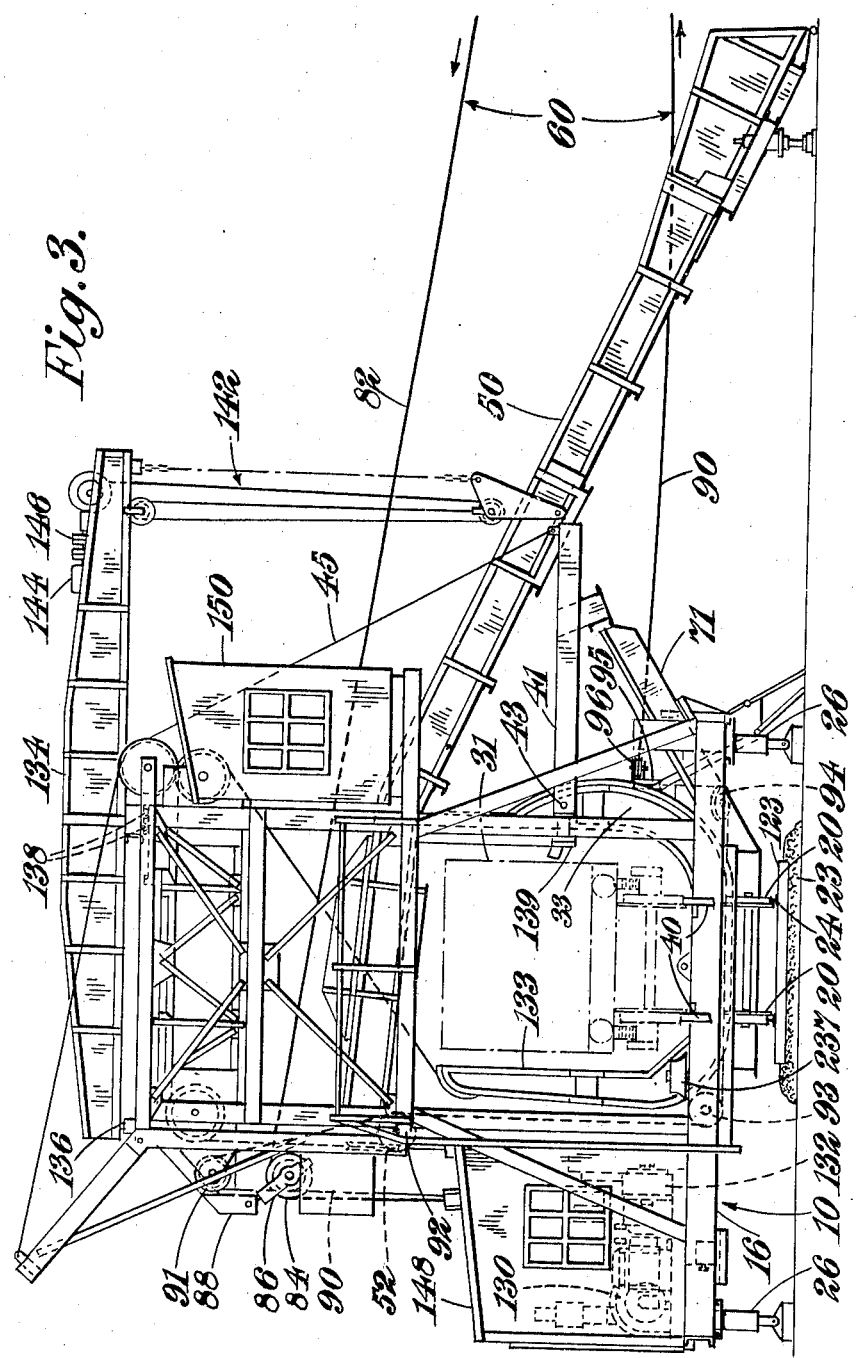

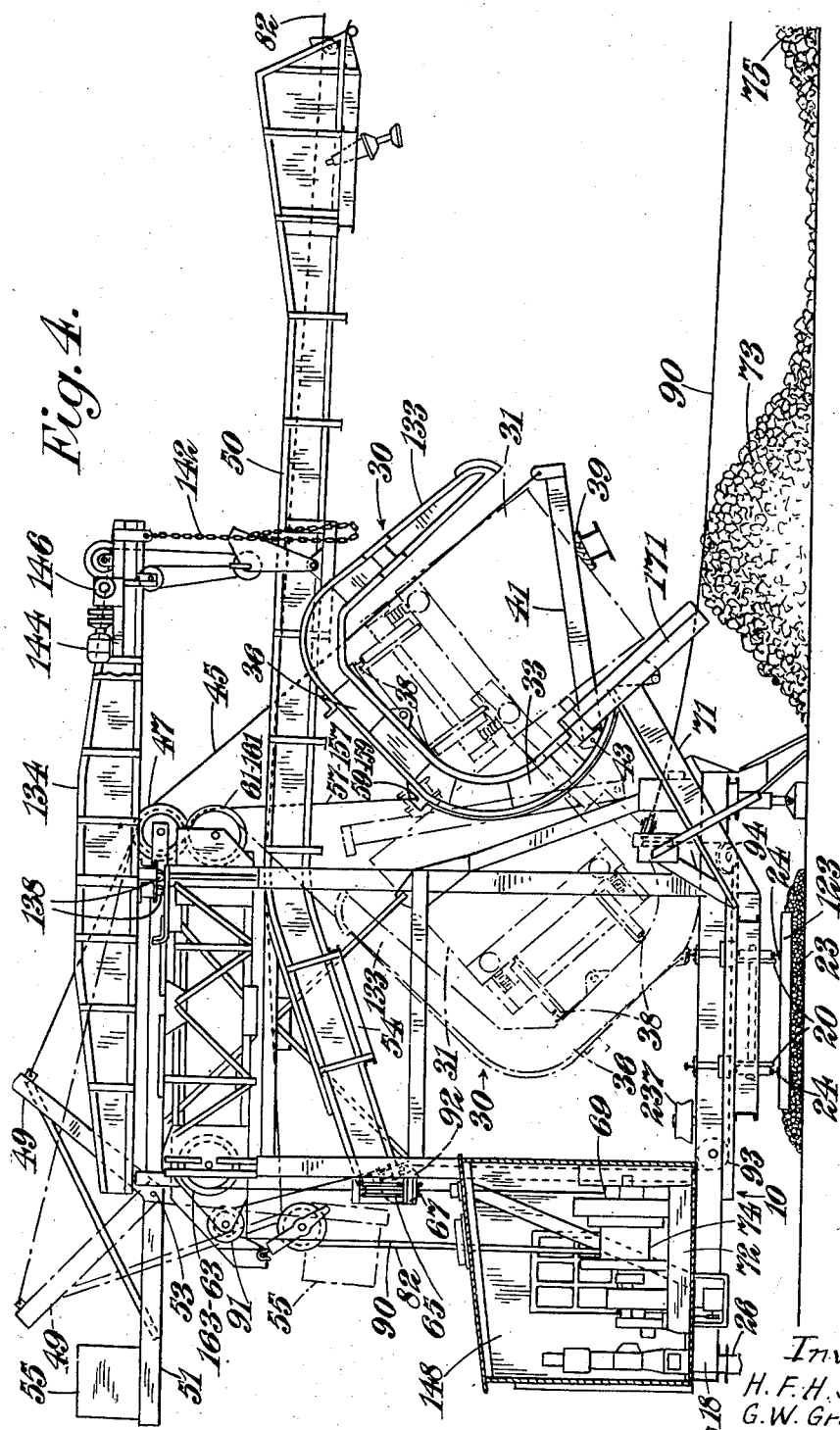

March 21, 1944.   H. F. H. SHIELDS ET AL   2,344,742
APPARATUS FOR LOADING AND UNLOADING WHEELED VEHICLES
Filed Feb. 10, 1943   10 Sheets-Sheet 6
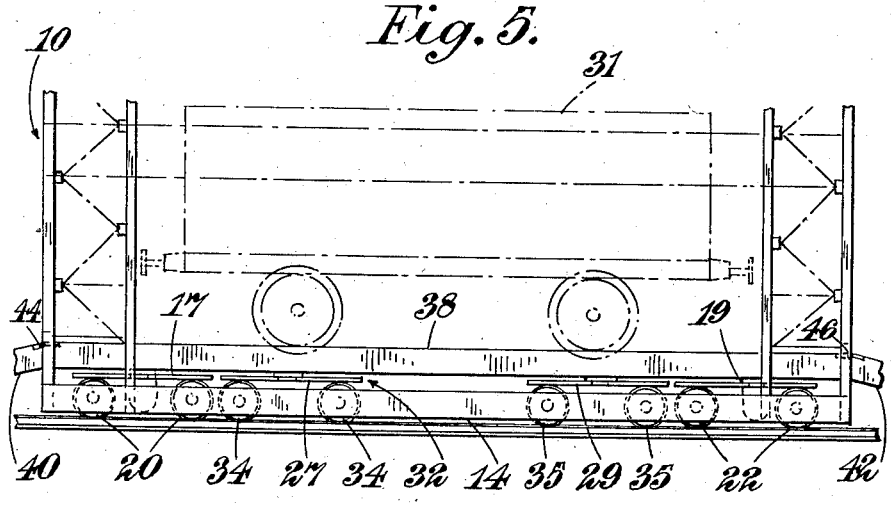
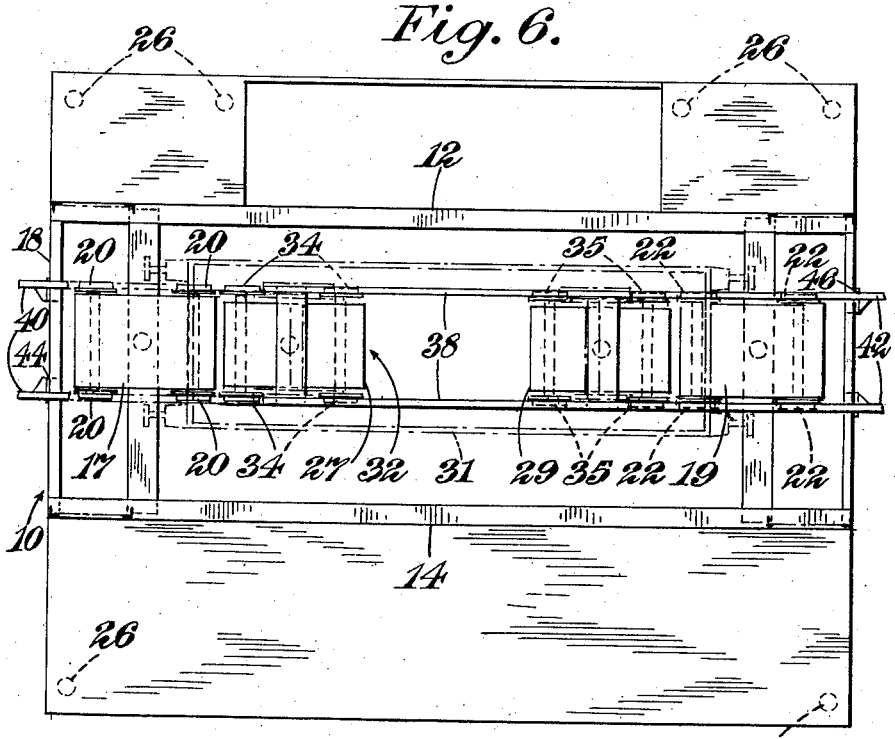
Inventors,
H. F. H. Shields and
G. W. Grossmith
By Young, Emery & Thompson
Attorneys

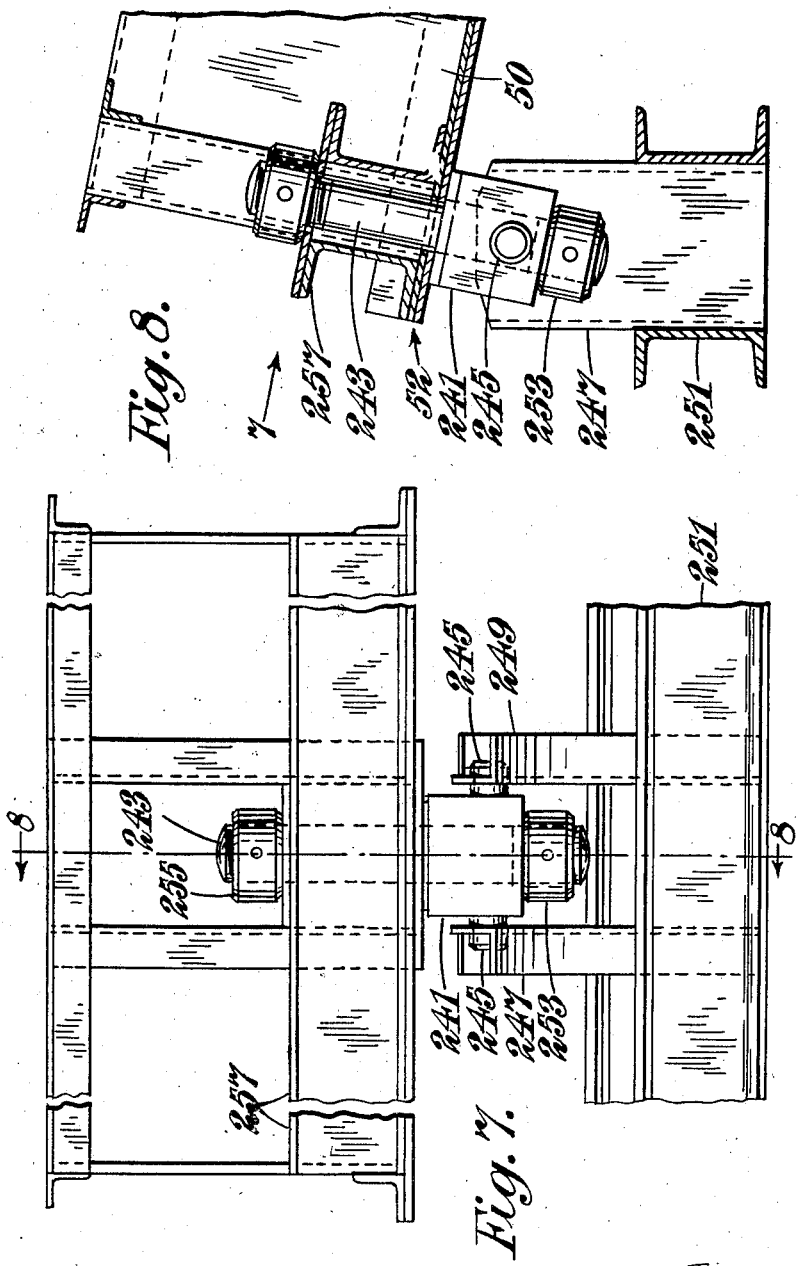

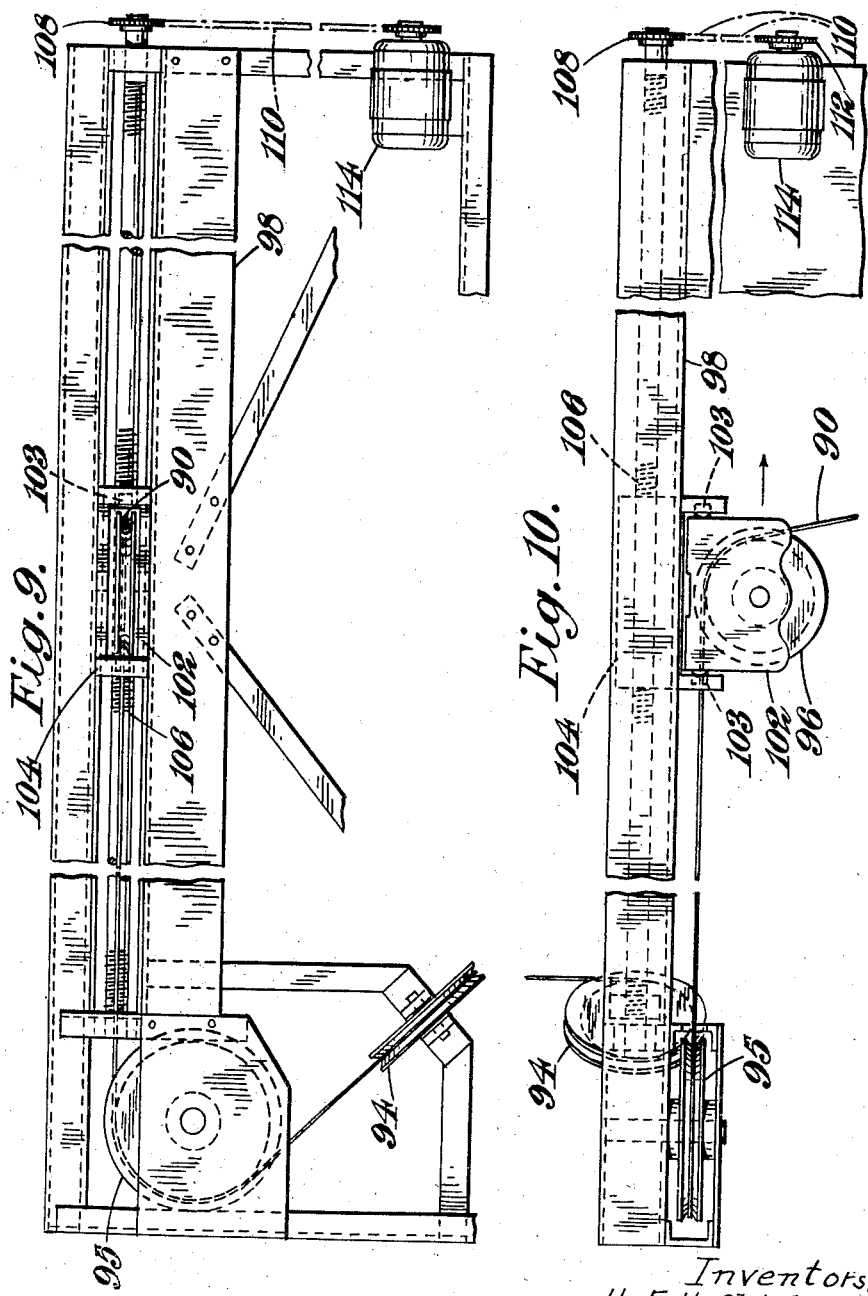

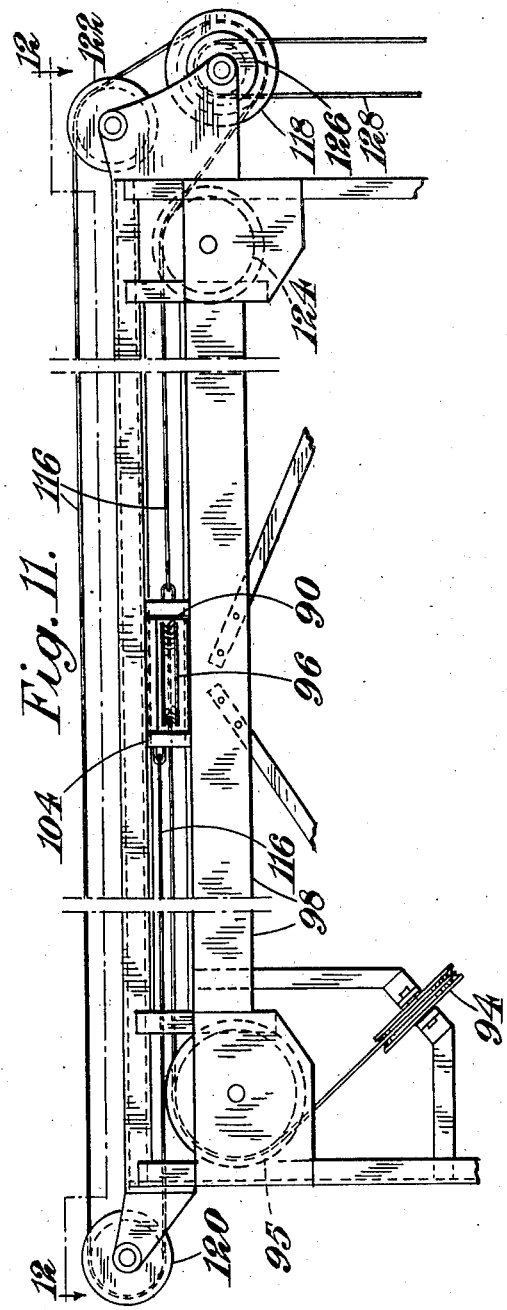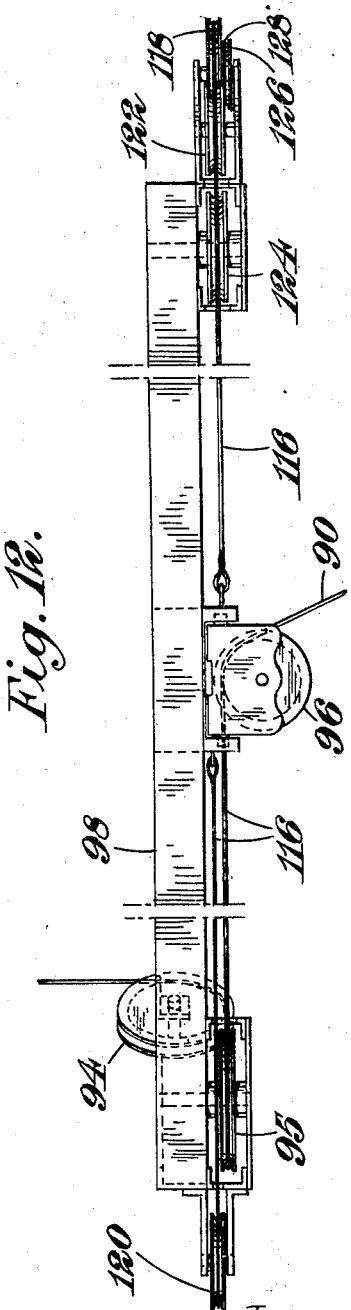

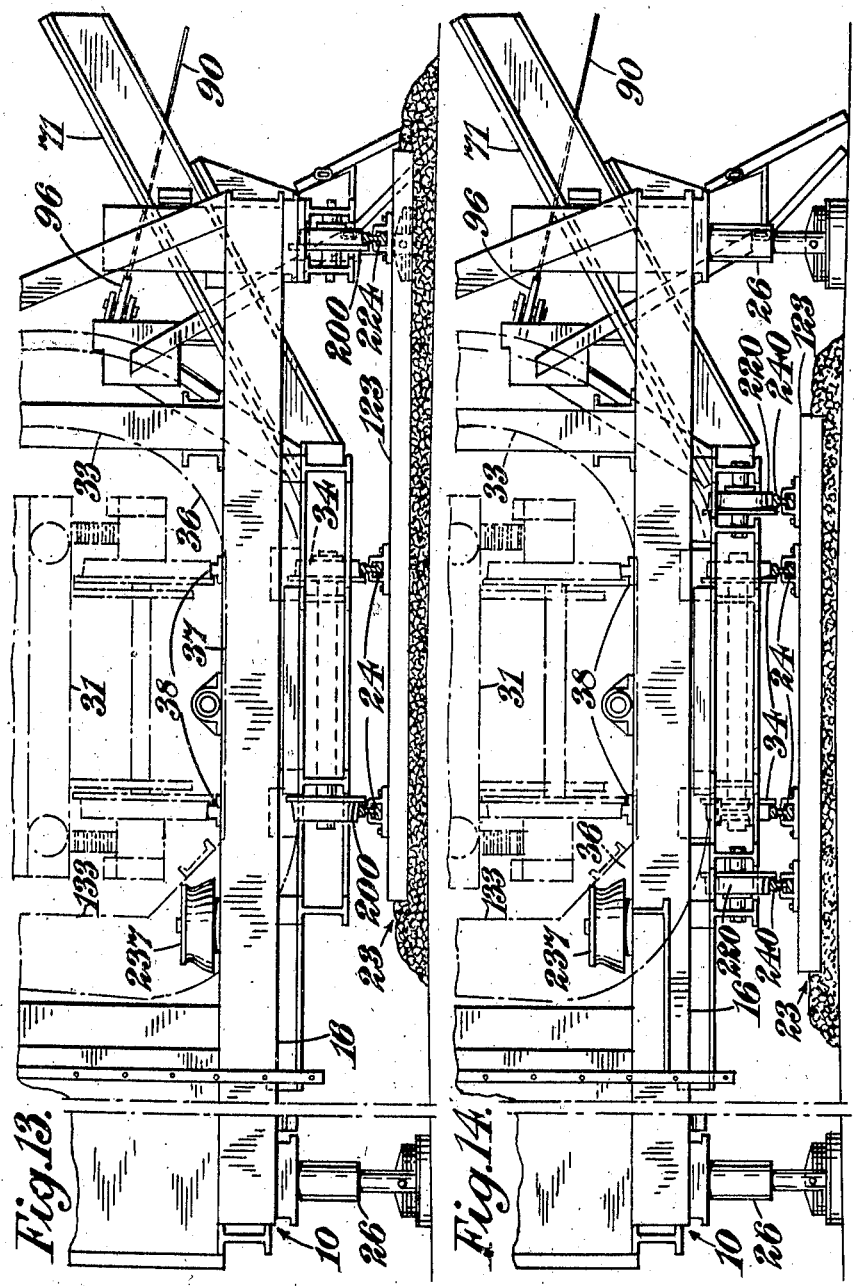

Patented Mar. 21, 1944

2,344,742

UNITED STATES PATENT OFFICE 2,344,742

APPARATUS FOR LOADING AND UNLOADING WHEELED VEHICLES

Herbert Frederick Henry Shields, London, and George Wilfred Grossmith, Bristol, England Application February 10, 1943, Serial No. 475,421
In Great Britain February 10, 1942

11 Claims. (Cl. 214—110)

This invention relates to apparatus for loading vehicles, such as railway wagons, with fragmentary material of various kinds, such as coal, gravel, and the like, hereinafter referred to generally as coal, and unloading the same, which apparatus is of the type (hereinafter referred to as the type described) comprising a loader for loading the vehicles, and a tipper for tipping the vehicles to unload them. The invention also relates to methods of stocking-out coal from loaded vehicles, and methods of reclaiming coal from dumps and loading empty vehicles.

In coal-stocking and reclaiming plant comprising apparatus of the type described used heretofore, the coal wagons have run to and from the tippler on one pair of rails of a railway track, and a travelling loader of the drag-scraper type has run on an adjacent pair of rails of a second railway track. The two distinct ground tracks were considered to be necessary in order to ensure that, when stocking out coal and the loader was not in use, the loader should not interfere with the running of the coal wagons on their ground track; when the plant was in use for tipping wagons to unload them and for making dumps for the purpose of stocking the coal, the coal wagons ran to, through and from the tippler on one pair of rails of one ground track, and the travelling loader was movable along a pair of rails of the adjacent ground track.

It is an object of the present invention to obviate the necessity of providing two distinct ground tracks, one for the tippler and a second for the loader, and to provide an improved method of stocking-out and reclaiming coal by means of apparatus of the drag-scraper type.

Another object it to arrange the loader and tippler of apparatus of the type described in an improved manner.

According to a feature of the invention there is provided a method of stocking-out coal from loaded vehicles by means of an apparatus of the drag-scraper type on a track, comprising the steps of successively running loaded vehicles along the said track to a vehicle-tipping device on the apparatus, successively tipping the loaded vehicles to form at the side of the track a heap of coal to be stocked by means of the drag scraper, and successively running the empty vehicles away from the tipping device along the same track. Owing to the loaded vehicles being run on the same track as that on which the loading apparatus of the drag-scraper type is movable, this method obviates the necessity of providing two distinct ground tracks, one for the loader and the second for the vehicles, whether loaded or empty.

According to another feature of the invention there is provided a method of loading vehicles with coal by means of an apparatus of the drag-scraper type on a track, comprising the steps of successively running empty vehicles to be loaded along the said track to a vehicle-tipping device on the said apparatus, successively filling coal by means of the drag scraper into vehicles situated on the tipping device, and successively running the loaded vehicles away from the vehicle-tipping device along the same track. In carrying out this method, also, only one ground track is required for the loading apparatus and the vehicles.

Preferably, the loaded or empty vehicles are run to and from the apparatus by way of the tipping device along a path situated in superposed parallel relation with the said track.

The invention further provides apparatus of the type described for carrying into practice the method set forth above, comprising a loader combined with a tippler to form an unitary structure. Such a structure is very compact as compared with a loader that is to travel along one ground track and a tippler that is to travel along a second ground track spaced laterally away on the ground from the first.

The loader and tippler may be arranged to travel along a track common to them both without preventing wagons from travelling on the same track to, through and from the tippler.

The loader may have a framework for running along a ground track, and the trippler may be connected to or situated in the framework, to and from which tippler vehicles can travel along the same or a parallel track, which loader is arranged to deliver coal to a vehicle in its loading position on the tippler.

Conveniently, the framework has two sloping pairs of rails, each constituting a ramp, extending downwards to rails on the ground, and the trippler comprises a pair of rails that are for receiving vehicles to be tipped and adjoin the ramps, which cradle-rails and ramps constitute said upper track, at least part of which framework is situated, when in use, between the ground track and the upper track and is arranged to travel together with the upper track.

The framework may be arranged to travel either on the same rails of the ground track as the upper track, or on one of the same rails of the ground track as the upper track and on a third rail of the ground track, or on a pair of rails on the ground track wider or narrower than those of the upper track.

Other features of the invention relate to a coal ramp of the loader mounted to swing up and down and about a vertical axis on the framework, lifting means for the coal ramp, and a movable pulley, around which the back-haul rope of the scraper device passes, arranged to be traversed on the framework.

One embodiment of the invention and modifications thereof are diagrammatically illustrated by way of example in the accompanying drawings, wherein—

Figures 1a and 1b illustrate in side elevation, partly broken away, one form of apparatus according to the invention comprising a loader of the drag-scraper type and a tippler carried by the loader, and Figures 2a and 2b are a plan view, partly broken away, of the apparatus shown in Figures 1a and 1b;

Figure 3 is a side elevation of the loader and tippler shown in Figure 1a, but drawn to a larger scale, and showing the tippler in its vertical position;

Figure 4 is a side vertical sectional elevation taken on the line 4—4 in Figure 2a showing the loader and tippler illustrated in Figure 1a, but drawn to a larger scale, illustrating the tipping operation;

Figure 5 is a detail front elevation of part of the main framework, and a truck in it provided with part of an upper track for carrying a wagon to be loaded, and Figure 6 is a plan view of the parts shown in Figure 5;

Figures 7 and 8 are respectively end elevation, and vertical section taken on the line 8—8 in Figure 7, showing a universal joint of the coal ramp;

Figures 9 and 10 are, respectively, detail plan view, and front elevation, showing one form of mechanism for traversing a pulley round which the back-haul rope passes, and Figures 11 and 12 are, respectively, detail plan view, and front elevation, showing a modified construction of traversing mechanism for the movable pulley of the back-haul rope; and Figures 13 and 14 are sectional end elevations showing two modified arrangements of rails on a ground track, on which the loader runs.

Like reference characters designate like parts throughout the several views.

Referring first to Figures 1 to 8, apparatus constituting a combined loader and unloader for loading and unloading wheeled vehicles, such as railway wagons, comprises a gantry-like framework, designated generally 10, of arched construction, which is rectangular as viewed in plan and in end elevation, and has two longitudinal sides 12, 14, and two ends 16, 18. This main frame 10 has two bogies 17, 19 with two pairs of wheels 20, 22, respectively, arranged to run on a ground track 23 comprising sleepers 123 carrying a pair of rails 24, on which empty and loaded wagons can run to and from the frame 10. Hydraulic or manually-operable jacks 26 may be provided at the ends of the frame 10 and/or, if desired, along one or both sides thereof, for distributing the load when working and for levelling the main frame.

A vehicle-tipping device, designated generally 30, hereinafter referred to as a tippler, for tipping a wheeled vehicle 31, shown in broken lines, is provided within the frame 10 on a truck 32 (see Figures 5 and 6) that may be either free in, or coupled at its ends to, the main frame, and has bogies 27, 29 with wheels 34, 35, respectively, arranged to run on the rails 24. Owing to the loader frame 10 and the wheeled truck 32 being provided with swivel bogies they are well adapted for passing over railway points and crossings, and around curves.

The tippler 30 may be of any convenient construction, and as illustrated comprises a cradle 36 that is carried by the truck. This cradle comprises two U-shaped end members each having limbs 33, 133 of unequal length, the bottom end portions of which U-shaped members carry a platform 37, on which is mounted a pair of cradle-rails 38 for receiving the wagon 31 to be tipped. This pair of cradle-rails 38 extends parallel with the ground rails 24, and adjoins two sloping pairs of rails 40, 42 constituting ramps that are hinged or pivoted at 44 and 46 to the truck, preferably so as to swing about horizontal and vertical axes, and extend from the opposite ends of the cradle-rails and slope downwards to the rails 24 of the ground track. The cradle-rails 38 and the ramps 40, 42 constitute an upper track, whereof the middle portion is carried by the truck. In this way there is provided for wheeled vehicles a path situated in superposed parallel relation with the ground track to permit vehicles to run to, through and from the main frame 10.

As shown most clearly in Figures 1a, 3 and 4, a supporting beam 39, constituting a locking bar, is arranged to engage and support the wagon 31 in its tipped position lying against a chock 139. This bar 39 is carried by two arms 41, whereof one end of each is pivoted at 43 on the cradle, and the other end has one end of one of two counter-balance ropes 45 attached to it. Each of these ropes 45 passes over a pulley 47, and has its other end attached to an arm 49 of one of two angle levers 49, 51 which are pivoted on the main frame at 53, and have each a counterweight 55 carried by their arms 51. A brace 149 connects the two arms 49, 51 of each lever. Two actuating ropes 57, 157 for the cradle have one end attached to the latter at 59, 159 (see Figure 4) on the bottom thereof. The rope 57 passes over pulleys 61, 63, 65 and 67, and the rope 157 passes over pulleys 161, 163, and these ropes have their other ends attached to a tippler winch 69 described hereinafter. When the cradle is moved from its wagon-filling position shown in Figure 3 to its tilted position shown in broken lines in Figure 4, the locking bar 39 is moved from its free position shown in Figure 3 so as to lie along the top of the wagon and hold it on the cradle-rails 38, in which position the shorter limbs 33 of the cradle rest upon upwardly and outwardly sloping supports 71, one at each end of the cradle. These shorter limbs carry a flat chute 235 which extends the length of the cradle, and bears against the ends of the runways 71 when the cradle is in its end tilted position. When the cradle is tilted into the position shown in full lines in Figure 4, its two limbs 33 roll on the supports 71 until the wagon is inverted and discharges its contents over the chute 235 to form a heap of coal 73 lying alongside the main frame 10 at the front thereof, which heap will be substantially as long as the length of the wagons that are tipped. This heap 73 will subsequently be stocked-out by apparatus of the drag-scraper type described hereinafter to form a stock of coal in the form of a dump 75, which apparatus forms part of the loader and is also used for reclaiming the stock 75 and loading it itno empty vehicles on the cradle-rails 38 as described hereinafter.

The loader comprises the wheeled framework 10 and a coal ramp 50 that is pivotally mounted on it by means of a universal joint designated generally 52, described hereinafter, so that the ramp 50 can swing up and down, and also laterally in both directions from a central position shown in Figure 2a. A rope-hauled drag-scraper device 48 in the form of a bucket is provided for conveying the coal away from the loader to form the dump 75, and for scraping the coal from the dump 75 up the ramp to load empty vehicles.

The universal joint 52 connecting the coal ramp 50 with the framework 10 may be of any convenient construction. As illustrated in Figures 7 and 8, the joint comprises two elements 241, 243 rotatable at right-angles to one another. The element 241 in the form of a rectangular block is rotatable about a horizontal axis and has pivots 245 journalled in two up right bearing brackets 247, 249, caried by a frame member 251. The element 243, which has the form of an axle having collars 253, 255 keyed on its opposite ends, is rotatable in the element 241, and extends through a transverse member 257 at the upper end portion of the ramp 50, which member 257 lies at the side of the frame 10 remote from the mouth of the ramp.

The ramp 50 has an outlet at 54 in its upper portion which is situated within the frame 10 and lies at an obtuse angle to the lower portion of the ramp. This outlet 54 serves for delivering the material to an empty wagon 31 on the cradle-rails 38. The lower portion 58 of the coal ramp is flared to form a mouth, and in some cases this mouth portion may be hinged vertically to swing away from and towards the ground so as to move out of the way when the scraper bucket 48 is being used for conveying coal unloaded from the wagons to form a dump.

The bucket 48 is attached at the front and rear to a haulage-rope designated generally 60. This rope, which is driven by power-operated means, described hereinafter, on the loader, is led around two sheaves 62 that are supported on a travelling tail tower 64, which may carry concrete ballast 66, and has wheels 68 on rails 70. The power-operated means for driving the rope 60 comprises a winch 72 having two drums 74 and 76 driven by an electric motor 80. Assuming that an empty wagon is being loaded, the inhaul run 82 of the rope (see Figures 2a and 3), to which the front chains of the bucket 48 will be attached, passes over a central pulley 84, journalled in a block 86 slung from a bracket 88 on the rear of the frame 10, and is connected to the drum 74. The back-haul run 90, which has its end connected to the back-haul drum 76, passes from the latter up and down over a pulley 91, over a pulley 92 to two pulleys 93, 94 at one end of the frame 10, and then round two pulleys 95, 96 spaced apart on the front of the frame at opposite sides of the centre thereof, which pulley 95 is journalled in a bearing bracket 97 that may be fixed on, or movable along a supporting member 98 in the form of a beam on the front of the frame 10. By driving the drums 74 and 76 in the appropriate direction, the scraper bucket 48 can be hauled in both directions, either when reclaiming by scraping coal from the dump 75 up the ramp 50 for delivery through its outlet 54 to a wagon 31, as described above, or when stocking-out by conveying coal to form the dump 75 from coal that has been tipped from a loaded wagon on the cradle to form the heap 73 at the side of the frame 10. When stocking-out, as shown in Figures 1a, 2a and 4, the ramp 50 will be elevated, and the bucket 48 will be attached to the back-haul run 90. In both cases the back-haul drum 76 is used for returning the empty bucket to its starting position.

The cradle 36 can be tilted by power-operated means comprising the tippler winch 69, that is driven by an electric motor 100, and is arranged to operate the said pair of ropes 57, 157. In order to permit the scraper bucket 48 to operate over the entire length of the heap 67, the bearing bracket of the pulley 96 around which the out-haul rope 90 passes is not fixed on the main frame, but is movable either manually or mechanically, or both manually and mechanically, in a direction transverse to the direction of length of that part of the outhaul rope to which the scraper bucket is attached.

As shown in Figures 9 and 10, the movable pulley 96 is journalled in a U-shaped member 102 which is itself pivoted at 103 in the arms of a U-shaped bearing bracket 104, so that the pulley 96 is movable about two axes situated at right-angles one to the other. The bearing bracket 104 is mounted on a screw-threaded spindle 106 which is journalled on the beam 98 that extends along the main frame 10 at a situation below the coal ramp when the latter is in its elevated position. This spindle 106 may be arranged to be rotated manually, but, as illustrated, one end carries a sprocket wheel 108 connected by an endless chain 110 with a driving sprocket wheel 112 driven by a motor 114. The back-haul rope 90 after passing round the pulley 96 is led round the end pulley 95 and the pulley 94 and so to the winch 72 as described above.

Figures 11 and 12 show a modified arrangement, in which the bearing bracket 104, slidable along the support 98, is arranged to be moved mechanically by a member 116, such as a chain or rope, which passes around two end pulleys 118, 120 at the ends of the support, and two idler pulleys 122, 124, and has its ends attached to opposite sides of the bearing bracket 104. The pulley 118 may be driven by a coaxial sprocket wheel 126 and a chain 128 by means of a motor, as described above with reference to Figures 9 and 10, for shifting the pulley 96 along the front of the main frame.

Power-operated means comprising a capstan 130 (see Figures 2a and 3) driven by an electric motor 132 is provided for moving the described combined loader and unloader along the ground track 23 by means of a capstan rope 233 having its end anchored at any convenient position. This rope 233 passes round a pulley 235, and round one of two other pulleys 237, 239 at opposite ends of the frame 10 according to the direction of travel of the entire machine.

Means for lifting and lowering the coal ramp 50 comprises a central jib 134 mounted on the top of the frame 10. This jib 134 which is substantially triangular as viewed in plan, has one end pivoted at 136 to swing about a vertical axis at the top of the rear of the frame 10, and is supported between its ends by wheels 138 on an arcuate track 140, and carries at its outer end lifting gear designated generally 142. This lifting gear in the form of a block-and-pulley tackle may be operated manually, or by an electric motor 144 on the outboard end of the jib, for driving the tackle through reduction gearing 146. The coal ramp 50 and the jib 134 can be slewed manually from their central position to a lateral position at either side thereof through an angle of about 45°. Alternatively, power-driven means may be provided for slewing the coal ramp and jib.

The power means comprising the winches 69 and 72 and the capstan 130 is accommodated in a house 148 on a platform at the rear of the frame 10 while a cabin 150 at the front of the frame 10 contains the controls of the scraper-winch 72 operating the scraper-device 48, the controls of the jacks 26, if operated hydraulically, and the controls of the electric motor 114, if provided, for lifting and lowering the coal ramp 50.

When the described machine constituting a combined loader and unloader is to be used for loading empty railway wagons, they will be run successively from the ground rails 24 up either the sloping ramp 40 or 42 and on to the cradle-rails 38 of the upper track for receiving through the opening 54 in the lowered ramp 50 coal that has been conveyed by the latter up the scraper-bucket 48, and the loaded wagons can then run on to the ground track 23 at the opposite end of the frame 10. When the described machine is to be used for stocking-out coal from loaded wagons on the cradle, these will be unloaded by tipping them to form the temporary heap 73 at the front side of the frame 10, and the coal forming the heap will be scraped away by the bucket 48 to form the dump 75 while the ramp 50 is lifted out of the way of the bucket and the back-haul rope. During this stocking-out operation the pulley 96 will be traversed to enable the bucket 48 to operate at various parts of the heap along its length. It will be appreciated that the described mobile machine forms no obstruction to the transit of either empty or full wagons along the ground track 23, when the machine is not being used for either of these loading or unloading operations, although only one ground track is provided for the empty and full wagons.

Instead of arranging the mobile framework 10 and the parts carried by it to travel on the same wagon-rails 24 of the ground track 23 as does the upper track 38, 40, 42, as shown in Figure 13 the framework 10 may travel on one of the wagon-rails 24 and on a third rail 224 on the ground track 23. For this purpose wheels 220 of the main frame 10 are spaced further apart, corresponding to the gauge of the rails 24, 224, than are the wheels 20 described above.

Alternatively, the framework 10 may travel on a distinct pair of rails of the ground track wider or narrower than the gauge of the upper track 38, 40, 42. As shown in Figure 14, the ground track 23 comprises two parallel pairs of rails 24 and 240, whereof the pair 240, on which wheels 220 of the main frame 10 run, is of wider gauge than the pair 24, on which the upper track 38, 40, 42 runs as described above.

In some cases the ground rails, on which the main frame 10 runs, may, however, both lie between the rails on which the upper track runs, in which case the rails 240 would both lie between the rails 24 shown in Figure 14, but this arrangement is not preferred, as it is preferable for the main frame 10 to have a broad wheel base.

Various modifications may be made in the details of construction described above, without departing from the invention. For example, the outlet opening 54 in the upper part of the ramp 50 may constitute the mouth of a hopper device which extends below it towards the cradle-rails 38 of the upper track. Also, the capstan may be used additionally for moving a railway wagon into and out of the tippler.

We claim:

1. Apparatus of the character described for use in loading vehicles with fragmentary material and stocking-out fragmentary material from loaded vehicles, comprising in combination a loader of the drag-scraper type and a tippler of the cradle type through which vehicles can travel, which loader and tippler are arranged to travel along a track common to them both and permit vehicles to travel on the same track to, through and from the tippler.

2. Travelling apparatus of the character described for use in loading vehicles with fragmentary material and stocking-out fragmentary material from loaded vehicles, comprising a drag-scraper loader having a framework for running along a ground track, means of the drag scraper type operatively connected to the framework, and a tippler of the cradle type situated in the framework, to and from which tippler vehicles can travel along the same track, which drag scraper means is arranged to deliver fragmentary material to a vehicle in its loading position on the tippler and also to stock out material discharged at one side of the ground track from the tippler.

3. Apparatus of the character described for use in loading vehicles with fragmentary material and stocking-out fragmentary material from loaded vehicles, comprising a drag-scraper loader which comprises a framework for running along a ground track, and two sloping pairs of rails, each constituting a ramp, extending downwards to rails on the ground track, and a tippler of the cradle type that is situated in the framework and comprises a pair of cradle-rails that are for receiving vehicles to be tipped and adjoin the ramps, which cradle-rails and ramps constitute an upper rail track, at least part of which framework is situated, when in use, between the ground track and the upper rail track and is arranged to travel together with the latter track.

4. Apparatus of the character described for use in loading vehicles with fragmentary material and stocking-out fragmentary material from loaded vehicles, comprising a loader of the drag-scraper type combined with a tippler to form a unitary structure, which tippler comprises a cradle having a pair of rails for receiving the vehicle to be tipped, and two sloping pairs of rails, each constituting a ramp, extend from opposite ends of the cradle-rails downward for bearing on rails on the ground.

5. Apparatus of the character described for use in loading vehicles with fragmentary material and stocking-out fragmentary material from loaded vehicles, comprising a loader of the drag-scraper type having a framework combined with a tippler to form a unitary structure, which loader comprises a loading ramp that is mounted to swing in a horizontal plane about a vertical axis on the framework above the tippler, and a rope-hauled scraper device for conveying fragmentary material up the loading ramp which has a delivery outlet arranged above the tippler for delivering to a vehicle on the tippler the material conveyed up the loading ramp by the scraper device.

6. Apparatus as set forth in claim 5, wherein the loading ramp is pivotally arranged to swing about a horizontal axis, a jib is mounted on the framework, and lifting means suspended from the jib is arranged to raise and lower the loading ramp.

7. Apparatus for use in unloading vehicles containing fragmentary material and stocking-out the fragmentary material removed from the loaded vehicles, comprising an unloader of the drag-scraper type having a main frame combined with a tippler to form a unitary structure, which unloader comprises a power-driven rope, a drag-scraper device attached thereto, a pulley that is mounted to move bodily on the main frame and has the back-haul run of the rope passing round it, and means for traversing the pulley on the main frame in a direction lying transversely of the direction of length of that portion of the back-haul run of the rope which lies between the drag-scraper device and the pulley.

8. Apparatus as set forth in claim 7, wherein the traversing means comprises a rotatable screw-threaded spindle that is journalled on the main frame and is arranged to traverse the said pulley.

9. Apparatus as set forth in claim 7, wherein the traversing means comprises a motor-driven member that is arranged to traverse the said pulley.

10. A method of stocking-out fragmentary material from loaded vehicles by means of an apparatus of the drag-scraper type adapted to travel along a track, comprising the steps of successively running loaded vehicles along the said track to a vehicle-tipping device on the apparatus, successively tipping the loaded vehicles to form at the side of the track a heap of fragmentary material to be stocked by means of the drag-scraper, successively running the empty vehicles away from the tipping device along the same track, and stocking out the heap by the drag-scraper.

11. Apparatus of the character described for use in loading vehicles with fragmentary material and stocking-out fragmentary material from loaded vehicles, comprising a drag-scraper loader which comprises a framework for running along a ground track, and two sloping pairs of rails, each constituting a ramp, extending downwards to rails on the ground track, and a tippler of the cradle type that is situated in the framework and comprises a pair of cradle-rails that are for receiving vehicles to be tipped and adjoin the ramps, which cradle-rails and ramps constitute an upper rail track, at least part of which framework is situated, when in use, between the ground track and the upper rail track and is arranged to travel together with the latter track, and wherein said framework has wheels arranged to travel on one of the same rails on the ground track as those to which the rails of the upper track extend, and on a third rail on the ground track.

HERBERT FREDERICK HENRY SHIELDS.
GEORGE WILFRED GROSSMITH.